(12) United States Patent
Chuang et al.

(10) Patent No.: US 11,772,363 B2
(45) Date of Patent: Oct. 3, 2023

(54) ELECTROMAGNETIC SHIELDING SUBSTRATE AND DISPLAY PANEL

(71) Applicant: HannStar Display Corporation, Taipei (TW)

(72) Inventors: Yao-Chih Chuang, Tainan (TW); Chia-Yu Liu, Tainan (TW); Chih-Wei Chen, Tainan (TW); Mei-Ling Chou, Tainan (TW); Ming-Liang Chen, Tainan (TW)

(73) Assignee: HannStar Display Corporation, Taipei (TW)

( * ) Notice: Subject to any disclaimer, the term of this patent is extended or adjusted under 35 U.S.C. 154(b) by 8 days.

(21) Appl. No.: 17/406,079

(22) Filed: Aug. 19, 2021

(65) Prior Publication Data

US 2022/0118743 A1   Apr. 21, 2022

(30) Foreign Application Priority Data

Oct. 15, 2020   (CN) .......................... 202011104400.9

(51) Int. Cl.
*B32B 17/06* (2006.01)
*B32B 9/00* (2006.01)

(52) U.S. Cl.
CPC .............. *B32B 17/06* (2013.01); *B32B 9/005* (2013.01); *B32B 2307/20* (2013.01); *B32B 2457/20* (2013.01)

(58) Field of Classification Search
CPC ..... B32B 9/005; B32B 17/06; B32B 2307/20; B32B 2457/20
See application file for complete search history.

(56) References Cited

U.S. PATENT DOCUMENTS

| 2013/0202715 A1* | 8/2013 | Wang ...................... C03C 3/095 424/618 |
| 2015/0162390 A1* | 6/2015 | Wang .................. H01L 51/5271 257/40 |

FOREIGN PATENT DOCUMENTS

CN         101213895 A  *  7/2008  ............. H01J 11/44

* cited by examiner

*Primary Examiner* — Maria V Ewald
*Assistant Examiner* — Ethan Weydemeyer
(74) *Attorney, Agent, or Firm* — JCIPRNET

(57) ABSTRACT

The disclosure provides an electromagnetic shielding substrate including a first substrate and an auxiliary layer. The auxiliary layer is disposed on the first substrate and directly contacts the first substrate. The auxiliary layer includes a first sublayer and a second sublayer. The second sublayer is connected between the first sublayer and the first substrate. The chemical ingredient of the first sublayer is $M_xO_y$, and the chemical ingredient of the second sublayer is $M_xO_z$, and M is selected from one of Nb, Mo, Ta, Te, Ti, Tl, Y, Yb, Zr, and Zn, where x and y are positive integers, and $y-1<z<y$. A display panel using the above electromagnetic shielding substrate is also provided.

9 Claims, 2 Drawing Sheets

ELECTROMAGNETIC SHIELDING SUBSTRATE AND DISPLAY PANEL

CROSS-REFERENCE TO RELATED APPLICATION

This application claims the priority benefit of china application no. 202011104400.9, filed on Oct. 15, 2020. The entirety of the above-mentioned patent application is hereby incorporated by reference herein and made a part of this specification.

BACKGROUND

Technical Field

The disclosure relates to a substrate and a display panel, and in particular to an electromagnetic shielding substrate and a display panel with electromagnetic protection effects.

Description of Related Art

The widespread application of display panels has completely changed people's lifestyles. The visual revolution has driven the vigorous development of display technology. For special applications in different scenarios, such as medical places and aviation aircrafts, in order to reduce the external electromagnetic interference of sophisticated electronic instruments, most of the display panels need to have electromagnetic shielding functions. Generally speaking, for this type of display panel, a transparent conductive film or a conductive polymer film is plated on one side of the display surface to achieve the electromagnetic protection. However, a thicker transparent conductive film tends to increase the reflectivity of the external ambient light, and a thinner transparent conductive tends to make the process control difficult, resulting in excessive variation of the resistance of the transparent conductive film. In addition, although the refractive index of the conductive polymer film is close to the refractive index of commonly used substrate materials (such as glass), the hardness of the conductive polymer film is low, and its service life is short. Therefore, an electromagnetic shielding layer that can be applied to display panels and has both low reflectivity and high reliability is still in urgent need of development.

SUMMARY

The disclosure provides a display panel which integrates electromagnetic protection and anti-reflection performance well.

The disclosure provides an electromagnetic shielding substrate which allows for a larger process tolerance.

The display panel of the disclosure includes a first substrate, a second substrate, an auxiliary layer, a pixel circuit layer, and a display medium layer. The first substrate has a first surface and a second surface opposite to each other. The second substrate is disposed opposite to the first substrate. The auxiliary layer is disposed on the first substrate and directly contacts the first surface or the second surface of the first substrate. The auxiliary layer includes a first sublayer and a second sublayer. The second sublayer is connected between the first sublayer and the first substrate. A chemical ingredient of the first sublayer is $M_xO_y$, and a chemical ingredient of the second sublayer is $M_xO_z$, and M is selected from one of Nb, Mo, Ta, Te, Ti, Tl, Y, Yb, Zr and Zn, where x and y are positive integers, and $y-1<z<y$. The pixel circuit layer is disposed on the second substrate. The display medium layer is disposed between the pixel circuit layer and the first substrate.

In an embodiment of the disclosure, the first substrate of the above-mentioned display panel is aluminosilicate glass.

In an embodiment of the disclosure, a thickness of the second sublayer of the above-mentioned display panel is smaller than a thickness of the first sublayer.

In an embodiment of the disclosure, the chemical ingredient of the first sublayer of the above-mentioned display panel is niobium pentoxide ($Nb_2O_5$), molybdenum trioxide ($MoO_3$), tantalum pentoxide ($Ta_2O_5$), tellurium dioxide ($TeO_2$), titanium dioxide ($TiO_2$), thallium oxide ($Tl_2O$), yttrium oxide ($Y_2O_3$), ytterbium oxide ($Yb_2O_3$), zirconium dioxide ($ZrO_2$) or zinc oxide (ZnO).

In an embodiment of the disclosure, a sheet resistance value of the auxiliary layer of the above-mentioned display panel is between $10^{10}$ ohms/square and $10^{12}$ ohms/square.

In an embodiment of the disclosure, the auxiliary layer of the above-mentioned display panel is located between the first substrate and the display medium layer.

In an embodiment of the disclosure, the above-mentioned display panel further includes an optical auxiliary layer disposed on a side of the auxiliary layer away from the first substrate. A refractive index of the auxiliary layer is greater than a refractive index of the optical auxiliary layer.

In an embodiment of the disclosure, a material of the optical auxiliary layer of the above-mentioned display panel is silicon dioxide ($SiO_2$), magnesium fluoride ($MgF_2$) or sodium hexafluoroaluminate ($Na_3AlF_6$).

In an embodiment of the disclosure, a thickness of the optical auxiliary layer of the above-mentioned display panel is between 100 angstroms and 400 angstroms.

In an embodiment of the disclosure, a thickness of the optical auxiliary layer of the above-mentioned display panel is between 50 angstroms and 200 angstroms.

An electromagnetic shielding substrate of the disclosure includes a first substrate and an auxiliary layer. The auxiliary layer is disposed on the first substrate and directly contacts the first substrate. The auxiliary layer includes a first sublayer and a second sublayer. The second sublayer is connected between the first sublayer and the first substrate. A chemical ingredient of the first sublayer is $M_xO_y$, and a chemical ingredient of the second sublayer is $M_xO_z$, and M is selected from one of Nb, Mo, Ta, Te, Ti, Tl, Y, Yb, Zr and Zn, where x and y are positive integers, and $y-1<z<y$.

Based on the foregoing, in the display panel of an embodiment of the disclosure, the auxiliary layer is provided on the surface of the substrate of the display panel, so as to reduce the reflectivity of the external ambient light. In the auxiliary layer, an oxygen content of the metal oxides of the second sublayer contacting the substrate is lower than an oxygen content of the metal oxides of the first sublayer not contacting the substrate, which thus results in a specific conductivity for the auxiliary layer to achieve an effect of electromagnetic protection. In addition, using inorganic metal oxides can also increase the hardness and service life of the auxiliary layer.

DETAILED DESCRIPTION OF DISCLOSED EMBODIMENTS

Figure 1:
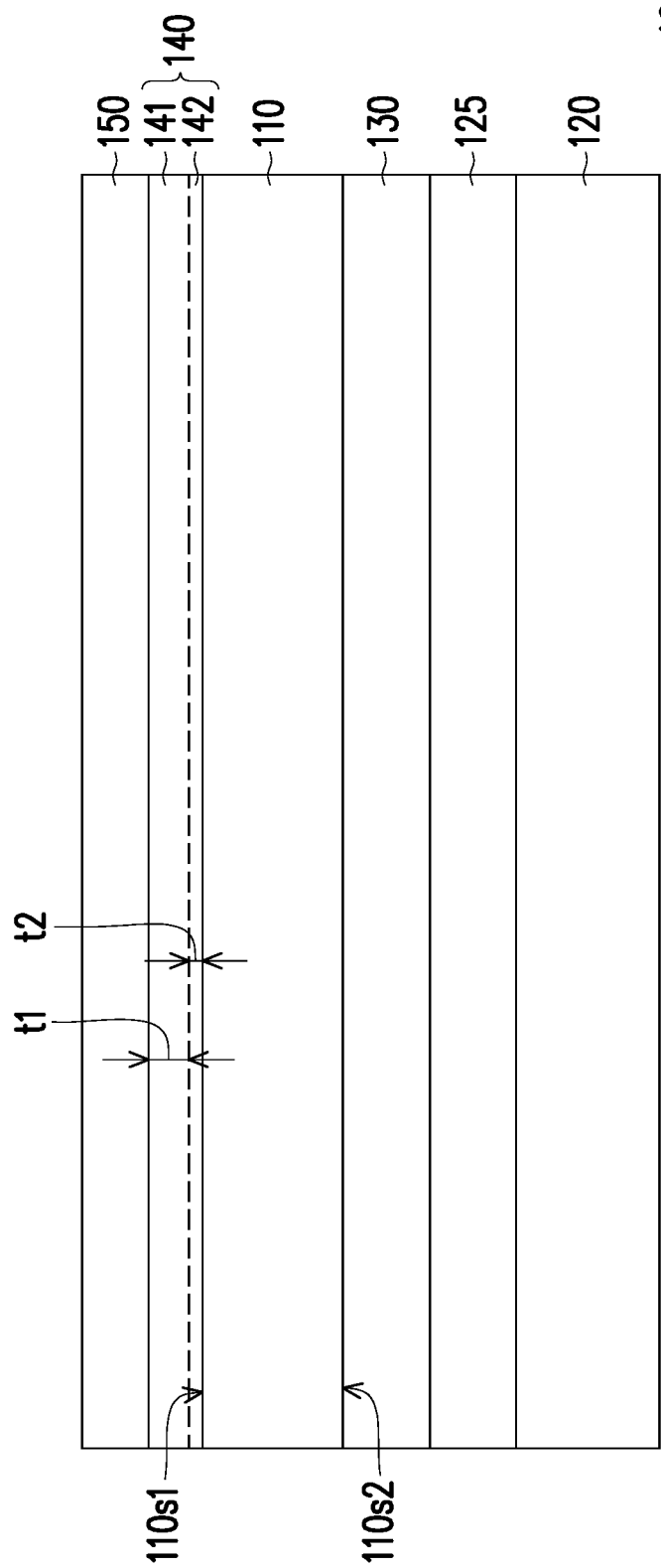
FIG. 1 is a schematic cross-sectional view of a display panel according to a first embodiment of the disclosure.

The foregoing and other technical content, features and effects of the disclosure will be clearly presented in the following detailed description of exemplary embodiments with reference to the accompanying drawings. The directional terms mentioned in the following embodiments, such as up, down, left, right, front or back, etc., are merely the directions with reference to the drawings. Therefore, the directional terms are used to illustrate rather than limit the disclosure. Hereinafter, some embodiments of the disclosure will be described to illustrate the disclosure in detail. Whenever possible, the same reference numerals are used in the drawings and the description to indicate the same or similar parts.

FIG. 1 is a schematic cross-sectional view of a display panel according to the first embodiment of the disclosure. Referring to FIG. 1, a display panel 10 includes a first substrate 110, a second substrate 120, a pixel circuit layer 125, a display medium layer 130 and an auxiliary layer 140. The first substrate 110 and the second substrate 120 are disposed on opposite sides of the display medium layer 130. The pixel circuit layer 125 is disposed on the second substrate 120 and located between the second substrate 120 and the display medium layer 130. The display medium layer 130 is disposed between the pixel circuit layer 125 and the first substrate 110.

For example, the materials of the first substrate 110 and the second substrate 120 may optionally be aluminosilicate glass, but they are not limited thereto. In other embodiments, the material of the first substrate 110 and the second substrate 120 may be quartz or other suitable glass materials (for example, soda lime glass, borosilicate glass, or the like). It should be noted that, in this embodiment, the materials of the first substrate 110 and the second substrate 120 are optionally the same, but are not limited thereto. In other embodiments, the materials of the first substrate 110 and the second substrate 120 may be different from each other.

In this embodiment, the display medium layer 130 may be a liquid crystal layer and include a plurality of liquid crystal molecules (not shown). In other words, the display panel 10 of this embodiment may be a liquid crystal display panel, but the disclosure is not limited thereto. In another embodiment, the display medium layer 130 may be a stacked layer of organic light emitting materials. That is, the display panel 10 may be an organic light emitting diode (OLED) panel. In another embodiment, the display medium layer 130 may include a plurality of light emitting components electrically connected to the pixel circuit layer 125, such as micro-light emitting diodes (micro-LEDs) or mini light emitting diodes (mini-LEDs), but is not limited thereto.

In addition, the pixel circuit layer 125 may include a plurality of active components (not shown), a plurality of pixel electrodes (not shown), and a plurality of signal lines (not shown). These signal lines are respectively disposed in two mutually perpendicular directions, and define a plurality of pixel areas of the display panel 10. The pixel electrodes are respectively disposed in the pixel areas, and each is electrically connected to at least one corresponding active component and at least two corresponding signal lines. However, the disclosure is not limited thereto. When the display panel 10 is a micro light emitting diode display panel or a mini light emitting diode display panel, the pixel circuit layer 125 may optionally include a plurality of bonding pads to electrically contact the above-mentioned light emitting components.

Furthermore, in this embodiment, the side of the display panel 10 on which the first substrate 110 is provided is the display side. The first substrate 110 has a first surface 110s1 and a second surface 110s2 that are opposite to each other. The auxiliary layer 140 is optionally disposed on the first surface 110s1 of the first substrate 110 away from the display medium layer 130, and the display medium layer 130 is located on the second surface 110s2 of the first substrate 110, but the disclosure is not limited thereto. In particular, the auxiliary layer 140 directly contacts the first surface 110s1 of the first substrate 110, and the auxiliary layer 140 is a stacked layer of a plurality of metal oxides. For example, the thickness of the auxiliary layer 140 may be between 50 angstroms and 200 angstroms. In particular, since the auxiliary layer 140 is disposed on the first substrate 110, the combination of the first substrate 110 and the auxiliary layer 140 may be regarded as an electromagnetic shielding substrate, and the electromagnetic shielding substrate is not limited to the application to the display panel 10. For example, the first substrate 110 provided with the auxiliary layer 140 may be a substrate of a touch panel, but is not limited thereto.

The auxiliary layer 140 includes a first sublayer 141 and a second sublayer 142. The thickness t2 of the second sublayer 142 is smaller than the thickness t1 of the first sublayer 141, and the oxygen content of the second sublayer 142 is lower than the oxygen content of the first sublayer 141. Specifically, the chemical ingredient of the first sublayer 141 is $M_xO_y$, and the chemical ingredient of the second sublayer 142 is $M_xO_z$, and M can be selected from one of Nb, Mo, Ta, Te, Ti, Tl, Y, Yb, Zr and Zn, where x and y are positive integers, and $y-1<z<y$. For example, the chemical ingredient of the first sublayer 141 is niobium pentoxide ($Nb_2O_5$), molybdenum trioxide ($MoO_3$), tantalum pentoxide ($Ta_2O_5$), tellurium dioxide ($TeO_2$), titanium dioxide ($TiO_2$), thallium oxide ($Tl_2O$), yttrium oxide ($Y_2O_3$), ytterbium oxide ($Yb_2O_3$), zirconium dioxide ($ZrO_2$) or zinc oxide (ZnO).

In this embodiment, the chemical ingredient of the first sublayer 141 of the auxiliary layer 140 is, for example, niobium pentoxide ($Nb_2O_5$), and the chemical ingredient of the second sublayer 142 is, for example, $Nb_2O_z$, wherein $4<z<5$. For example, the method of forming the auxiliary layer 140 may include: providing a piece of aluminosilicate glass as the first substrate 110, forming an auxiliary material layer (not shown) on the first substrate 110, performing a heat treatment process, and transforming the auxiliary material layer into the auxiliary layer 140. The material of the auxiliary material layer is $Nb_2O_5$, and a part of the auxiliary material layer located away from the first substrate 110 and another part of the auxiliary material layer contacting the first substrate 110 respectively form the first sublayer 141 and the second sublayer 142 of the auxiliary layer 140.

In particular, since the electrochemical potential of aluminum in the chemical ingredient of the first substrate 110 is greater than the electrochemical potential of niobium in the auxiliary material layer, the driving force of the reaction between aluminum and oxygen is higher than the driving force of the reaction between niobium and oxygen. Therefore, during the heat treatment process of the auxiliary material layer, part of the oxygen element in the auxiliary material layer contacting the first substrate 110 tends to bond with aluminum element, and as a result, the oxygen content of the part of the auxiliary material layer contacting the first substrate 110 is reduced, and the second sublayer 142 is formed with the chemical ingredient of $Nb_2O_z$, where $4<z<5$.

It is worth mentioning that the sheet resistance of the auxiliary material layer before the heat treatment process is greater than $10^{12}$ ohms/square. After the heat treatment process is completed, the sheet resistance is between $10^{10}$ ohms/square and $10^{12}$ ohms/square. More specifically, in this embodiment, through the heat treatment process, the auxiliary material layer directly contacting the first substrate 110 can be converted into the auxiliary layer 140 with a specific conductivity (for example, a conductivity greater than $10^4$ Siemens/cm), and the conductivity of the auxiliary layer 140 increases with the increase of the heat treatment temperature. In other words, the auxiliary layer 140 which has undergone the heat treatment process can be used as the electromagnetic shielding layer of the display panel 10, thereby achieving the effect of electromagnetic protection. Furthermore, since the auxiliary layer 140 is made of inorganic metal oxides, the hardness and service life can be significantly increased.

However, the disclosure does not limit the method of forming the auxiliary layer 140. In another embodiment, during the thermal evaporation process of the auxiliary material layer, the second sublayer 142 with a lower oxygen content may be formed by controlling the oxygen flow rate in the reaction chamber.

Furthermore, the display panel 10 may optionally include an optical auxiliary layer 150. The optical auxiliary layer 150 is disposed on a side of the auxiliary layer 140 away from the first substrate 110, and the refractive index of the auxiliary layer 140 is greater than the refractive index of the optical auxiliary layer 150. For example, the refractive index of the optical auxiliary layer 150 at the wavelength of visible light may be less than 1.5, and the refractive index of the auxiliary layer 140 at the wavelength of visible light may be greater than 2, but it is not limited thereto. In this embodiment, the material of the optical auxiliary layer 150 is, for example, silicon dioxide ($SiO_2$), but it is not limited thereto. In other embodiments, the material of the optical auxiliary layer 150 may be magnesium fluoride ($MgF_2$), sodium hexafluoroaluminate ($Na_3AlF_6$), or other materials with a low refractive index (for example, materials whose refractive index at the wavelength of visible light is less than 1.5). In addition, the thickness of the optical auxiliary layer 150 may be between 100 angstroms and 400 angstroms.

The auxiliary layer 140 with high refractive index and the optical auxiliary layer 150 with low refractive index are sequentially stacked on the first surface 110s1 of the first substrate 110, which effectively helps the first surface 110s1 of the first substrate 110 to reflect less external ambient light, thereby improving the display quality of the display panel 10 (for example, the contrast in dark state).

Figure 2:
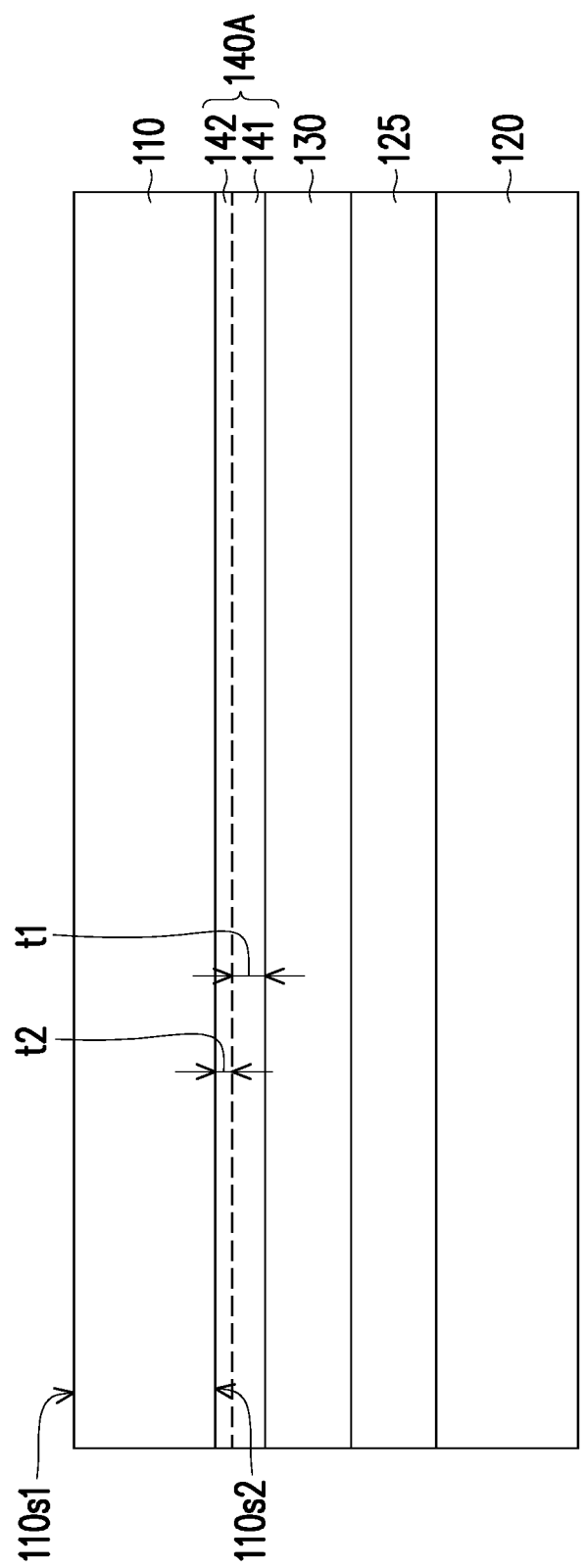
FIG. 2 is a schematic cross-sectional view of a display panel according to a second embodiment of the disclosure.

FIG. 2 is a schematic cross-sectional view of a display panel according to a second embodiment of the disclosure. Referring to FIG. 2, the difference between the display panel 11 of this embodiment and the display panel 10 of FIG. 1 is that the auxiliary layer is disposed in a different way. In this embodiment, the auxiliary layer 140A of the display panel 11 is disposed on the second surface 110s2 of the first substrate 110 and is located between the display medium layer 130 and the first substrate 110.

Since the method of forming the auxiliary layer 140A of this embodiment is similar to the method of forming the auxiliary layer 140 of the foregoing embodiment, for detailed description, please refer to the relevant paragraphs of the foregoing embodiment, and the description will not be repeated here. It is worth mentioning that, compared with the conventional case of using a transparent conductive film (such as an indium tin oxide film) as an electromagnetic shielding layer, the auxiliary layer 140A of this embodiment has a larger sheet resistance value (for example, $10^{10}$ to $10^{12}$ ohms/square), which is more suitable for the electromagnetic shielding layer when it needs to have a high sheet resistance value, and its sheet resistance value (or conductivity) may be adjusted by the reaction temperature of the heat treatment process. In other words, unlike the conventional transparent conductive film that requires a thinner film thickness in order to obtain a higher sheet resistance value, which makes the process control difficult, the auxiliary layer 140A of this embodiment may allow for a larger process tolerance. In addition, the display panel 11 can maintain the optical performance of low reflectivity while achieving the electromagnetic protection effect.

As mentioned above, in the display panel of an embodiment of the disclosure, the auxiliary layer is provided on the surface of the substrate of the display panel, so as to reduce the reflectivity of the external ambient light. In the auxiliary layer, the oxygen content of the metal oxides of the second sublayer contacting the substrate is lower than the oxygen content of the metal oxides of the first sublayer not contacting the substrate, which thus results in a specific conductivity of the auxiliary layer to achieve the effect of electromagnetic protection. In addition, using inorganic metal oxides can also increase the hardness and service life of the auxiliary layer.

Finally, it should be noted that the above embodiments are only used to illustrate the technical solutions of the disclosure, but not to limit them; although the disclosure has been described in detail with reference to the foregoing embodiments, those of ordinary skill in the art should understand that they can still modify the technical solutions described in the foregoing embodiments, or equivalently replace some or all of the technical features; however, these modifications or replacements do not cause the essence of the corresponding technical solutions to deviate from the scope of the technical solutions of the embodiments of the disclosure.

What is claimed is:

1. A display panel, comprising:
   a first substrate having a first surface and a second surface opposite to each other, wherein the first substrate is aluminosilicate glass;
   a second substrate disposed opposite to the first substrate;
   an auxiliary layer disposed on the first substrate and directly contacting the first surface or the second surface of the first substrate, and the auxiliary layer comprising:
   a first sublayer and a second sublayer, wherein the second sublayer is directly connected between the first sublayer and the first substrate, a thickness of the second sublayer is smaller than a thickness of the first sublayer, a part of the auxiliary layer contacting the first substrate is formed as the second sublayer after a heat treatment, part of oxygen elements of the part of the auxiliary layer is transferred to the first substrate during the heat treatment, a chemical ingredient of the first sublayer is $M_xO_y$, a chemical ingredient of the second sublayer is $M_xO_z$, and M is selected from one of Nb, Mo, Ta, Te, Ti, Tl, Y, Yb, Zr and Zn, wherein x and y are positive integers, and y−1<z<y;
   a pixel circuit layer disposed on the second substrate; and
   a display medium layer disposed between the pixel circuit layer and the first substrate.

2. The display panel as claimed in claim 1, wherein the chemical ingredient of the first sublayer is niobium pentoxide ($Nb_2O_5$), molybdenum trioxide ($MoO_3$), tantalum pentoxide ($Ta_2O_5$), tellurium dioxide ($TeO_2$), titanium dioxide (TiO$_2$), thallium oxide (Tl$_2$O), yttrium oxide (Y$_2$O$_3$), ytterbium oxide (Yb$_2$O$_3$), zirconium dioxide (ZrO$_2$) or zinc oxide (ZnO).

3. The display panel as claimed in claim 1, wherein a sheet resistance value of the auxiliary layer is between $10^{10}$ ohms/square and $10^{12}$ ohms/square.

4. The display panel as claimed in claim 3, wherein the auxiliary layer is located between the first substrate and the display medium layer.

5. The display panel as claimed in claim 1, further comprising:
an optical auxiliary layer disposed on a side of the auxiliary layer away from the first substrate, wherein a refractive index of the auxiliary layer is greater than a refractive index of the optical auxiliary layer.

6. The display panel as claimed in claim 5, wherein a material of the optical auxiliary layer is silicon dioxide (SiO$_2$), magnesium fluoride (MgF$_2$) or sodium hexafluoroaluminate (Na$_3$AlF$_6$).

7. The display panel as claimed in claim 5, wherein a thickness of the optical auxiliary layer is between 100 angstroms and 400 angstroms.

8. The display panel as claimed in claim 1, wherein a thickness of the auxiliary layer is between 50 angstroms and 200 angstroms.

9. An electromagnetic shielding substrate, comprising:
a first substrate; and
an auxiliary layer disposed on the first substrate and directly contacting the first substrate, a sheet resistance value of the entire auxiliary layer is between $10^{10}$ ohms/square and $10^{12}$ ohms/square, and the auxiliary layer comprising:
a first sublayer and a second sublayer, wherein the second sublayer is connected between the first sublayer and the first substrate, a chemical ingredient of the first sublayer is $M_xO_y$, a chemical ingredient of the second sublayer is $M_xO_z$, and M is selected from one of Nb, Mo, Ta, Te, Ti, Tl, Y, Yb, Zr and Zn, wherein x and y are positive integers, and y−1<z<y.

* * * * *